United States Patent
Kukla (10) Patent No.: US 11,951,921 B2
(45) Date of Patent: Apr. 9, 2024

(54) VEHICLE HOOD BUMPER

(71) Applicant: GM Global Technology Operations LLC, Detroit, MI (US)

(72) Inventor: Robert J. Kukla, Rocester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 128 days.

(21) Appl. No.: 17/550,763

(22) Filed: Dec. 14, 2021

(65) Prior Publication Data

US 2023/0182667 A1  Jun. 15, 2023

(51) Int. Cl.
| | |
|---|---|
| *E05F 5/02* | (2006.01) |
| *B60R 19/02* | (2006.01) |
| *B60R 19/18* | (2006.01) |
| *B60R 19/28* | (2006.01) |
| *B60R 19/32* | (2006.01) |
| *B62D 25/12* | (2006.01) |

(52) U.S. Cl.
CPC ............ *B60R 19/32* (2013.01); *B60R 19/023* (2013.01); *B60R 19/18* (2013.01); *B60R 19/28* (2013.01); *B62D 25/12* (2013.01); *E05F 5/022* (2013.01); *B60R 2019/186* (2013.01); *E05Y 2900/536* (2013.01)

(58) Field of Classification Search
CPC . E05F 5/02; E05F 5/022; B62D 25/12; B60R 19/32; B60R 19/023; B60R 19/28; B60R 19/18; B60R 2019/186
See application file for complete search history.

(56) References Cited

U.S. PATENT DOCUMENTS 2,683,015 A * 7/1954 Campbell ................ F16F 7/09
                                                    267/140.11

FOREIGN PATENT DOCUMENTS

| CN | 209959021 U | 1/2020 | |
|---|---|---|---|
| DE | 102005041479 A1 * | 3/2006 | ............. E05F 5/022 |
| DE | 102005041479 A1 | 3/2006 | |
| EP | 1104726 A1 | 6/2001 | |

OTHER PUBLICATIONS

Computer translation for DE 102005041479A1 (Year: 2006).*
German Office Action for German Application No. 102022124857.7; dated Apr. 19, 2023; 9 pages.

* cited by examiner

*Primary Examiner* — Amy R Weisberg
*Assistant Examiner* — Melissa Ann Bonifazi
(74) *Attorney, Agent, or Firm* — CANTOR COLBURN LLP (57) ABSTRACT

A hood bumper for a vehicle having a hood including: a housing having a wall, a base, an internal chamber, and an opening to the internal chamber. The wall having an interior surface and an exterior surface. the interior surface defines the internal chamber. The hood bumper further including a biasing mechanism operably connected to the housing and a plunger operably connected to the biasing mechanism and configured to receive an exerted force from the hood. The hood bumper further including a bumper head operably connected to the housing and a support frame operably connecting the bumper head to the housing. The plunger is configured to first move into the bumper head to absorb an impact force to the hood, next the bumper head compresses to further absorb the impact force, and then the support frame collapses to even further absorb the impact force.

20 Claims, 6 Drawing Sheets

VEHICLE HOOD BUMPER

INTRODUCTION

The subject disclosure relates to a hood bumper for a vehicle with a hood.

Vehicles with a hood covering the engine compartment or front trunk (i.e., frunk) often include hood bumpers. The hood bumpers may serve as protection for other parts of the vehicle in such situations as over-slamming of the hood. In addition, when the hood is in a closed position, the hood bumpers may allow for deformation of the hood when a significant force is applied.

For such situations, programs such as regional NCAP (New Car Assessment Program) and Global Technical Regulation (GTR) have developed safety standards and criteria, including head impact criteria (HIC), that may require the hood to deform a sufficient distance to meet the criteria. To achieve this, some vehicles employ hood bumpers or brackets that break away when experiencing a significant amount of force, causing the hood to deform, and thereby providing a buffer between components in the engine compartment or front trunk.

SUMMARY

In one exemplary embodiment, a hood bumper for a vehicle having a hood is provided. The hood bumper including: a housing having a wall, a base, an internal chamber, and an opening to the internal chamber. The wall having an interior surface and an exterior surface. The interior surface defines the internal chamber. The hood bumper further including a biasing mechanism operably connected to the housing and a plunger operably connected to the biasing mechanism and configured to receive an expected force from the hood. The plunger is configured to move from an extended position to a compressed position into the internal chamber and compress the biasing mechanism when the force is greater than a first magnitude. The hood bumper further including a bumper head operably connected to the housing. The plunger being configured to protrude through the bumper head in the extended position and being configured to fully move into the bumper head when the exerted force is greater than a second magnitude. The bumper head is configured to receive the force from the hood when the force is greater than the second force. The bumper is configured to be compressible when the force is above the second magnitude. The hood bumper also including a support frame operably connecting the bumper head to the housing. The support frame is collapsible from an uncollapsed position to a collapsed position when the force is greater than a third magnitude.

In addition to one or more of the features described herein, or as an alternative, further embodiments may include that the bumper head is configured to collapse with the support frame from the uncollapsed position to the collapsed position.

In addition to one or more of the features described herein, or as an alternative, further embodiments may include that the bumper head further includes a first head end, a second head end located opposite the first head end, an impact portion located at the first head end, a side wall extending from the impact portion to the second head end, and a cavity defined within the bumper head.

In addition to one or more of the features described herein, or as an alternative, further embodiments may include that the support frame is operably connected to the bumper head via the cavity.

In addition to one or more of the features described herein, or as an alternative, further embodiments may include that the bumper head further includes: a through hole extending from the cavity through the impact portion. The plunger extends through the through hole when in the extended position.

In addition to one or more of the features described herein, or as an alternative, further embodiments may include that the support frame further includes a radially outward wall, a radially inward wall located radially inward from the radially outward wall, and a head connecting the radially outward wall to the radially inward wall.

In addition to one or more of the features described herein, or as an alternative, further embodiments may include that the support frame further includes an upper end, a lower end located, and an upper wall located at the upper end. The upper wall including an upper surface and a lower surface. The upper wall further includes a plunger opening extending through the upper wall. The plunger extends through the plunger opening into the bumper head.

In addition to one or more of the features described herein, or as an alternative, further embodiments may include that the radially outward wall is in a facing spaced relationship with the radially inward wall forming a channel therebetween. The channel being defined by the radially outward wall, the radially inward wall, and the head.

In addition to one or more of the features described herein, or as an alternative, further embodiments may include that the housing further includes a first end and a second end located opposite the first end, the wall extending from the first end to the second end. The base is located at the first end and the opening is located at the second end. The second end of the wall is located in the channel.

In addition to one or more of the features described herein, or as an alternative, further embodiments may include that the second end of the wall is located at a distance away from the head in the uncollapsed position. The distance between the second end of the wall and the head decreases or goes to zero in the collapsed position.

In addition to one or more of the features described herein, or as an alternative, further embodiments may include that the radially inward wall of the support frame further include a radially inner surface, a radially outer surface, and an inner step extending about the radially outer surface. The radially inward surface of the wall further includes an outer step. The inner step is configured to fit within the outer step, interlock with the outer step, or rest on the outer step to maintain the support frame in the uncollapsed position.

In addition to one or more of the features described herein, or as an alternative, further embodiments may include that the radially inner surface of the radially inward wall of the support frame defines a cavity within the radially inward wall of the support frame. A portion of the plunger is located within the cavity.

In addition to one or more of the features described herein, or as an alternative, further embodiments may include that a section of the radially inward wall of the support frame is located within the internal chamber.

In addition to one or more of the features described herein, or as an alternative, further embodiments may include that the radially inward wall of the support frame further includes a notch.

In addition to one or more of the features described herein, or as an alternative, further embodiments may include that the notch extends from the radially inner surface to the radially outer surface.

In addition to one or more of the features described herein, or as an alternative, further embodiments may include that the notch is triangular in shape.

In one exemplary embodiment, a vehicle is provided. The vehicle includes a compartment, a hood to cover the compartment, and at least one hood bumper configured to contact the hood. The at least one hood bumper includes a housing having a wall, a base, an internal chamber, and an opening to the internal chamber. The wall having an interior surface and an exterior surface. The interior surface defines the internal chamber. The hood bumper further including a biasing mechanism operably connected to the housing and a plunger operably connected to the biasing mechanism and configured to receive an expected force from the hood. The plunger is configured to move from an extended position to a compressed position into the internal chamber and compress the biasing mechanism when the force is greater than a first magnitude. The hood bumper further including a bumper head operably connected to the housing. The plunger being configured to protrude through the bumper head in the extended position and being configured to fully move into the bumper head when the exerted force is greater than a second magnitude. The bumper head is configured to receive the force from the hood when the force is greater than the second force. The bumper is configured to be compressible when the force is above the second magnitude. The hood bumper also including a support frame operably connecting the bumper head to the housing. The support frame is collapsible from an uncollapsed position to a collapsed position when the force is greater than a third magnitude.

In addition to one or more of the features described herein, or as an alternative, further embodiments may include that the bumper head is configured to collapse with the support frame from the uncollapsed position to the collapsed position.

In addition to one or more of the features described herein, or as an alternative, further embodiments may include that the bumper head further includes a first head end, a second head end located opposite the first head end, an impact portion located at the first head end, a side wall extending from the impact portion to the second head end, and a cavity defined within the bumper head.

In addition to one or more of the features described herein, or as an alternative, further embodiments may include that the support frame is operably connected to the bumper head via the cavity.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Hood bumpers are often used in association with hoods of vehicles to absorb the impact of the hood being slammed shut. If the hood of the vehicle is slammed shut too hard it may damage the area of the vehicle below the hood. Additionally, if the hood of the vehicle is impacted by an object at too high of a force, it may damage the area of the vehicle beneath the hood. The embodiments disclosed herein seek to provide a hood bumper that includes three stages of operation to absorb three different magnitudes of force on the hood. The first stage includes a retractable and resettable plunger that is biased using a biasing mechanism that allows the plunger to absorb the force of the normal everyday usage of closing the hood while allowing the plunger to rebound back into a deployed position. The second stage provides protection from over slam of the hood using a bumper head composed of a compressible material (e.g., rubber). The third stage includes a structural frame that is configured to collapse into a housing below the structural frame when the force on the hood exceeds a force with a magnitude that may be larger than the force from a typical over slam and may indicate that the hood has been struck by an object.

Figure 1:
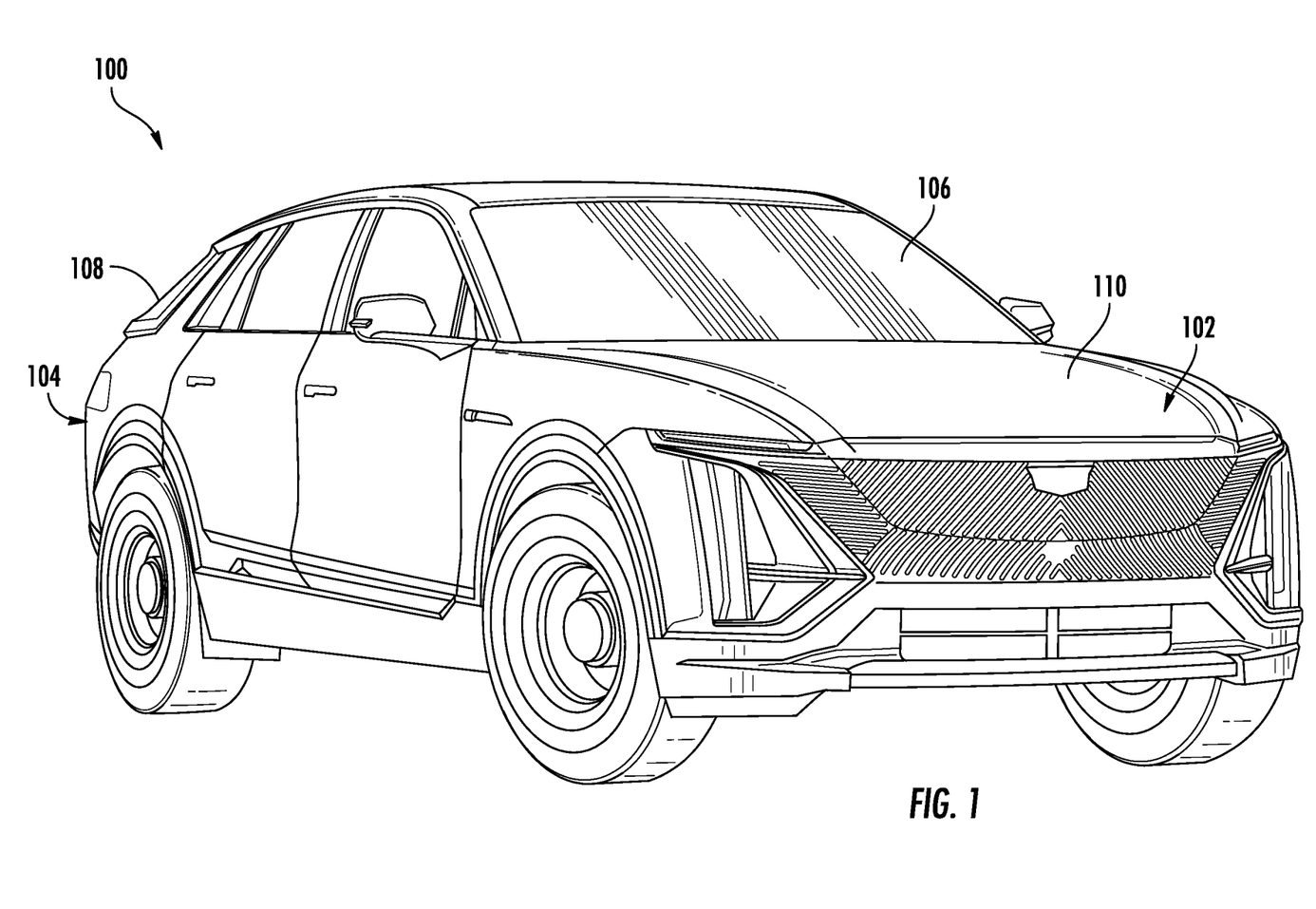
FIG. 1 is a front perspective view of a vehicle that may incorporate embodiments of the present disclosure.

Referring now to FIG. 1, a front perspective view of a vehicle 100 is illustrated and portrayed herein for purposes of discussion as a sports utility vehicle (SUV). The vehicle 100 is merely an exemplary application with which the novel aspects and features of this disclosure may be practiced. As such, it is understood that the embodiments disclosed herein are not limited to SUVs and the embodiments disclosed here may be applicable to other vehicles.

The vehicle 100 includes a front end 102 and a rear end 104 located opposite the front end 102. The vehicle 100 also includes a passenger compartment 106 for housing passengers of the vehicle 100, a trunk 108 at the rear end 104 of the vehicle 100, and a hood 110 at the front end 102 of the vehicle 100. While the embodiments disclosed herein relate predominately to the hood 110 of the vehicle 100, they may also be applicable to other compartments of the vehicle 100 including the trunk 108, a mid-engine engine compartment, or any other compartment capable of opening or closing in the vehicle 100.

Figure 2A:
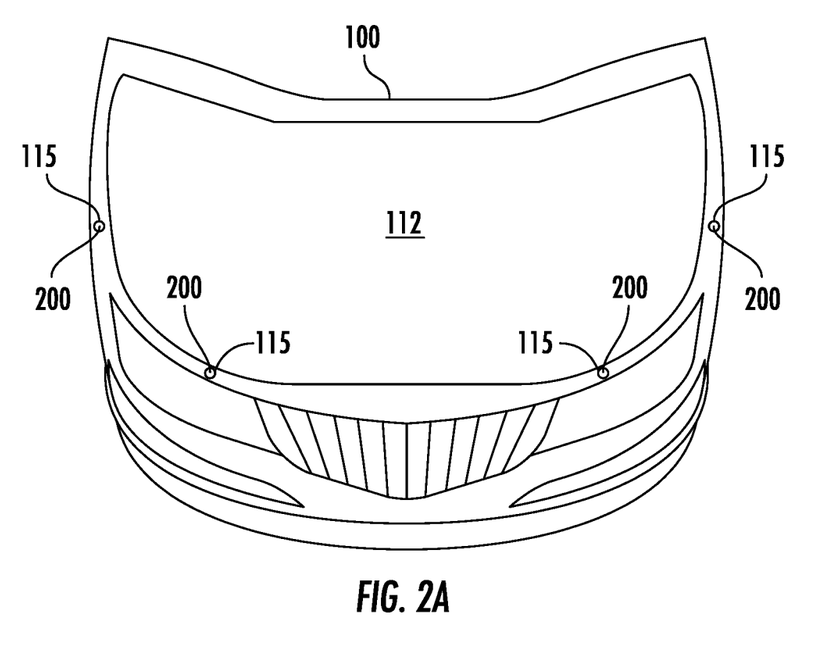
FIG. 2A is a schematic, plan view of an engine compartment of a vehicle with hood bumpers, according to an embodiment of the present disclosure.
Figure 2B:
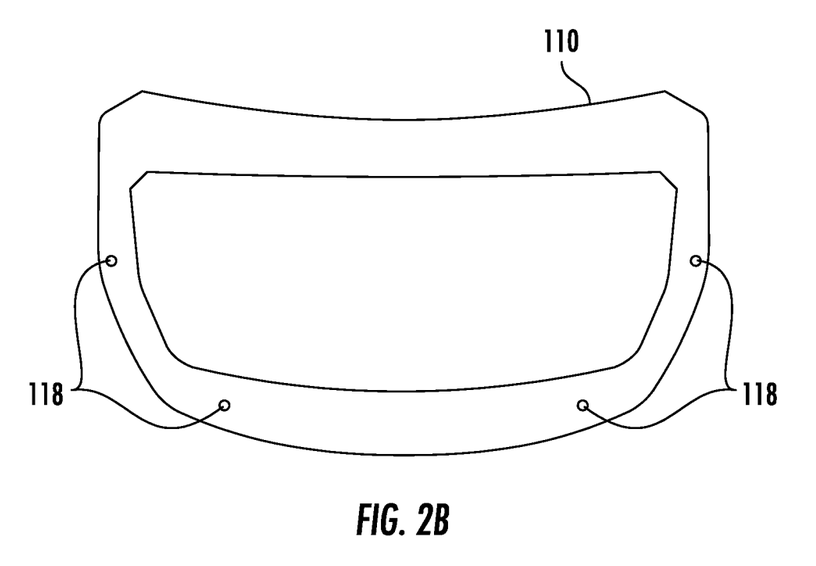
FIG. 2B is a schematic, bottom view of a hood of the vehicle of FIG. 2A illustrating contact points of the hood bumpers with the hood, according to an embodiment of the present disclosure.

Referring now to FIGS. 2A and 2B, with continued reference to FIG. 1, a plan view of a front compartment 112 of the vehicle 100 is illustrated in FIG. 2A, and the corresponding hood 110 for covering the front compartment 112 is illustrated in FIG. 2B. The front compartment 112 may be an engine compartment, a front trunk compartment, or a front compartment for various systems of the vehicle 100.

The material of the hood 110 generally may be, but is not limited to, steel or aluminum. The vehicle 100 has receiving holes 115 located adjacent to the front compartment 112 for receiving hood bumpers 200 therein such that the hood bumpers 200 are attached to the vehicle 100. The hood bumpers 200 contact the hood 110 at contact points 118 when the hood 110 is closed or being closed. In an alternative embodiment, the hood bumpers 200 may be attached to the hood 110 and are configured to impact contact points around the front compartment 112.

Figure 3:
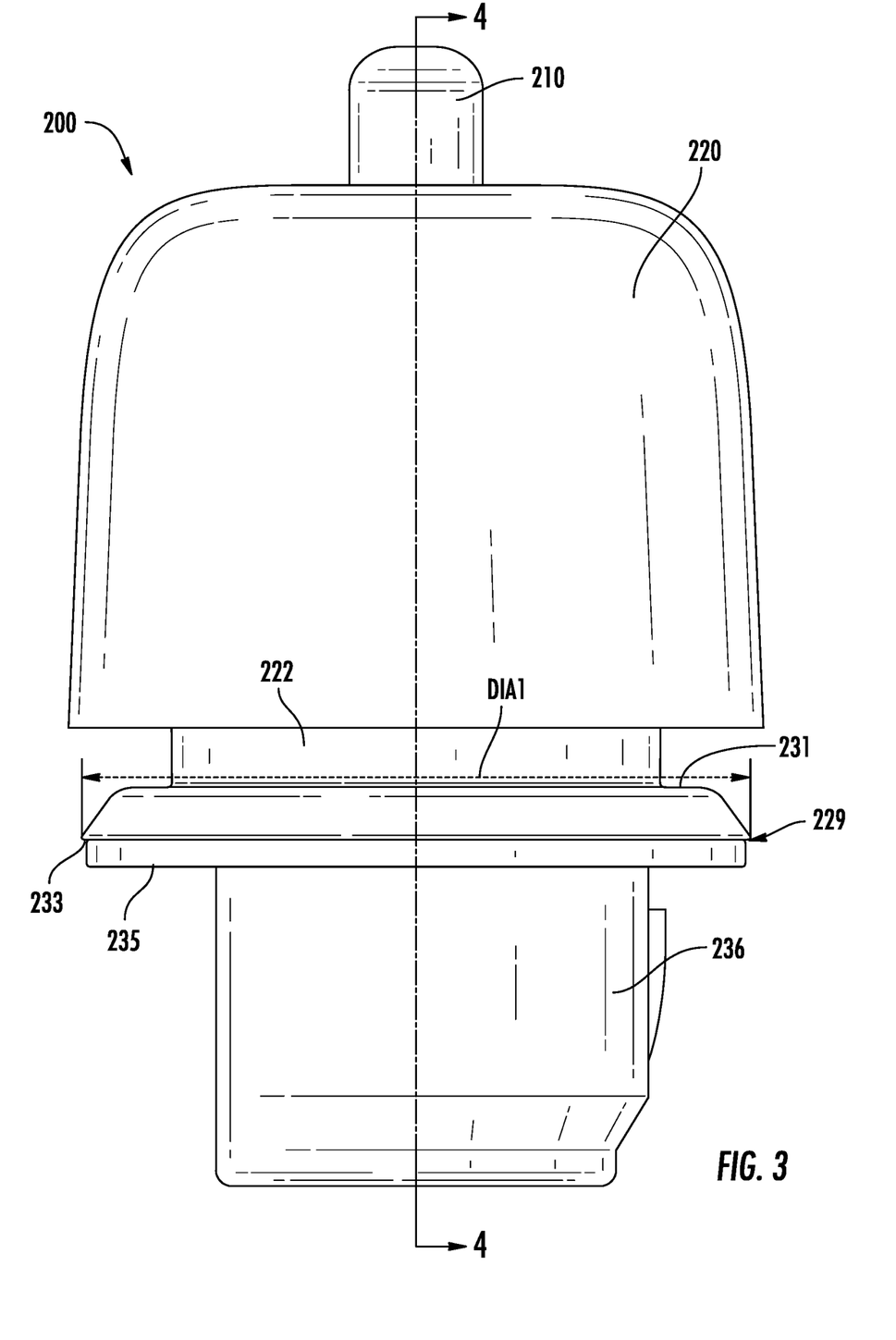
FIG. 3 is a side view of one of the hood bumpers of FIG. 2A, according to an embodiment of the present disclosure.

Referring now to FIG. 3, with continued reference to FIGS. 1, 2A, and 2B, the hood bumper 200 is illustrated, in accordance with an embodiment of the present disclosure. The hood bumper 200 generally includes a plunger 210, a bumper head 220, and a housing 222.

The hood bumper 200 is a three-stage hood bumper. The plunger 210 is the first component to compress into the hood bumper 200 upon hood 110 impact by a force of a first magnitude. If the force is equal to or greater than a second magnitude, the plunger 210 will fully compress into the hood bumper 200 until the bumper head 220 is impacted. The second magnitude being greater than the first. Then for forces between the second magnitude and a third magnitude greater than the second magnitude, the bumper head 220 compresses. When the force is greater than the third magnitude then the bumper head 220 is configured to collapse down towards the housing 222.

The force may be the result of over-slamming of the hood 110, or the result of an object striking the hood 110 at a high velocity, thereby generating a greater magnitude of force. In the situation of over-slamming of the hood 110, the hood bumpers 200 may act as shock absorbers to protect other components of the vehicle 100. In the situation of an object, particularly a large object, striking the hood 110, the collapsing of the bumper heads 220 allows for deformation of the hood to better absorb the impact of the object striking the hood. The housing 222 includes a lower section 236 that is configured to have an interference fit with a corresponding receiving hole 115, which enables the hood bumper 200 to be secured to the perimeter of the front compartment 112.

The housing 222 of the hood bumper 200 includes a support flange 229 having a first surface 231 and a second surface 233. The support flange 229 is configured to act as a stop, such that when the hood bumper 200 is inserted into a receiving hole 115 (see FIG. 2A), the support flange 229 will position the hood bumper 200 therein. The support flange 229 may include a washer 235 adjacent to the second surface 233. The washer 235 may be attached to the support flange 229 or separate therefrom. The washer 235 may be composed of a rubber material to provide added protection between the second surface 233 and the surface of the vehicle 100 surrounding the receiving hole 115.

Figure 4A:
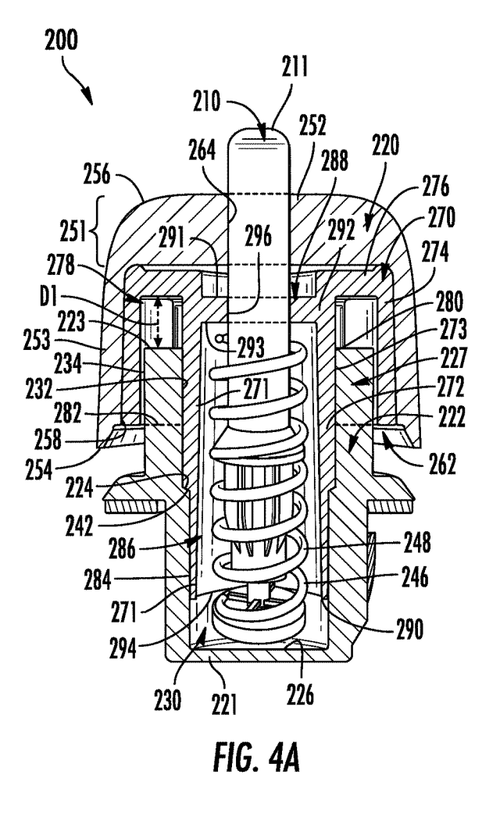
FIG. 4A is a cross-sectional view of the hood bumper of FIG. 3 with a plunger in a deployed position, a support frame in an uncollapsed position, and a bumper head in an uncollapsed position, according to an embodiment of the present disclosure.
Figure 4B:
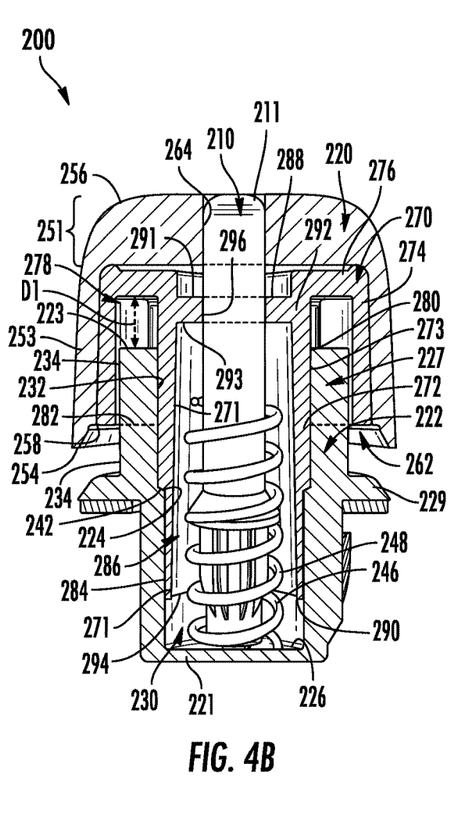
FIG. 4B is a cross-sectional view of the hood bumper of FIG. 3 with the plunger in the compressed position, the support frame in the uncollapsed position, and the bumper head in the uncollapsed position, according to an embodiment of the present disclosure.
Figure 4C:
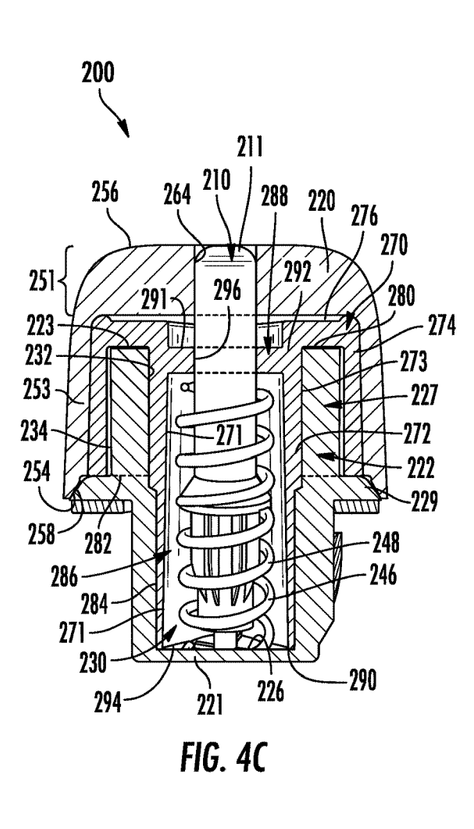
FIG. 4C is a cross-sectional view of the hood bumper of FIG. 3 with the plunger in the compressed position, the support frame in a collapsed position, and the bumper head in a collapsed position, according to an embodiment of the present disclosure.

Referring now to FIGS. 4A, 4B, and 4C, a cross-sectional view of the hood bumper 200 is illustrated, in accordance with an embodiment of the present disclosure. The bumper head 220 is operably connected to the housing 222 through a support frame 270. The support frame 270 is operably connected to the housing 222 as described further herein.

The housing 222 includes a first end 221, a second end 223 located opposite the first end 221, a base 226 located at the first end 221, an opening 280 located at the second end 223, and a wall 227 extending from the first end 221 to the second end 223. In other words, the wall 227 extends from the opening 280 to the base 226.

The wall 227 includes an interior surface 232 and an exterior surface 234. The opening 280 may be defined by the interior surface 232. The interior surface 232 also defines an internal chamber 230 extending from the opening 280 to the base 226. The support flange 229 extends radially outward from the exterior surface 234 of the wall 227 and may extend completely or intermittently about the perimeter thereof. The housing 222 may be constructed of a rigid material, such as, but not limited to, plastic, metal, or other suitable material.

The plunger 210 is operably connected to the housing 222. The plunger 210 may be operably connected to the housing 222 through the biasing mechanism 246. More specifically, the plunger 210 may be operably connected to the base 226 of the housing 222. More particularly, the biasing mechanism 246 is located within the internal chamber 230 of the housing 222 where it seats against the base 226.

The plunger 210 is normally in an extended position, in which the plunger is supported by the biasing mechanism 246 above the bumper head 220, as illustrated in FIG. 4A. The plunger 210 protrudes through the bumper head 220 in the extended position.

The bumper head 220 may be made of an elastic or flexible material, which may be, but is not limited to, rubber. The bumper head 220 includes a first head end 252 and a second head end 254 located opposite the first head end 252. The bumper head 220 includes an impact portion 251 at the first head end 252 and a side wall 253 extending from the impact portion 251 to the second head end 254. The bumper head 220 includes an outer surface 256 extending from the first head end 252 to the second head end 254 over the impact portion 251 and the side wall 253. The outer surface 256 may be dome shaped, as illustrated in FIGS. 4A, 4B, and 4C. An inner surface 258 of the bumper head 220 defines a cavity 262. The support frame 270 may be operably connected to the bumper head 220 within the cavity 262 via an interference fit or an adhesive.

The bumper head 220 also includes a through hole 264. The through hole 264 extends from the cavity 262 through the impact portion 251 and is configured to receive the tip 211 of the plunger 210 in a sliding relationship therewith. The plunger 210 extends through the through hole 264 and projects away from the bumper head 220 when the plunger 210 is in the deployed or non-compressed position of FIG. 4A.

The plunger 210 may be constructed of a rigid material, such as, but not limited to, plastic, metal, or other suitable material. The plunger 210 is configured to transfer force into the hood bumper 200 through biasing mechanism 246. In an embodiment, the biasing mechanism 246 may be a spring that has a plurality of coils 248.

The biasing mechanism 246 extends between the base 226 of the housing 222 and the plunger 210. The biasing mechanism 246 acts to reset the plunger 210 from the compressed position of FIG. 4B to the extended position of FIG. 4A. In addition, the spring constant of the biasing mechanism 246 also may be a factor in determining the relationship between the deflection of the plunger 210 and the force applied on it. The spring constant may be adjusted based on the material and/or slam type of the hood 110 and the desired predetermined magnitude of force.

The support frame 270 is partially enclosed within the cavity 262 of the bumper head 220. The support frame 270 includes a radially inward wall 272, a radially outward wall 274 located radially outward from the radially inward wall 272, and a head 276 that connects the radially outward wall 274 to the radially inward wall 272. The radially outward wall 274 is in a spaced relationship with the radially inward wall 272 defining a channel 278 therebetween. The channel 278 is defined by the radially outward wall 274, the radially inward wall 272, and the head 276. While channel 278 is defined on three sides by the radially outward wall 274, the radially inward wall 272, and the head 276, the channel 278 is open on a fourth side at a channel opening 282, opposite the head 276.

The radially inward wall 272 includes a radially inner surface 271 and a radially outer surface 273. The radially inward wall 272 defines a cavity 286 therein that encloses the biasing mechanism 246. A portion of the plunger 210 is also enclosed within the cavity 286 of the support frame 270. When the plunger 210 is compressed the portion of the plunger 210 located within the cavity 286 increases.

The support frame 270 also includes an upper end 288 and a lower end 290 located opposite the upper end 288. The support frame 270 includes an upper wall 292 located at the upper end 288 and a lower opening 294 located at the lower end 290. The upper wall 292 includes an upper surface 291 and a lower surface 293 located opposite the upper surface 291.

The upper wall 292 may also include a plunger opening 296. The plunger opening 296 extends through the upper wall 292. The plunger 210 extends through the plunger hole 296 and then into the through hole 264 of the bumper head 220, as illustrated in FIGS. 4A, 4B, and 4C To maintain the bumper head 220 in the uncollapsed position, the housing 222 includes an outer step 224 along at least a portion of the interior surface 232 of the wall 227. Correspondingly, the support frame 270 has an inner step 242 along at least a portion of the radially outer surface 273 of the radially inward wall 272. The inner step 242 is configured to engage the outer step 224, interlock with the outer step 224, or rest on the outer step 224 to maintain the support frame 270 in the uncollapsed position, as illustrated in FIGS. 4A and 4B.

The outer step 224 and the inner step 242 may have a conical shape as illustrated in FIGS. 4A, 4B, and 4C, which advantageously may allow the inner step 242 to slide off of the outer step 224 when the applied load or force of the hood 110 slam exceeds a predetermined value causing a lower portion of the support frame 270 to deform.

The inner step 242 may extend three-hundred and sixty degrees around the radially outer surface 273 of the radially inward wall 272. The inner step 242 may have a conical shape as illustrated in FIGS. 4A, 4B, and 4C. The inner step 242 may have a shape that matches or mirrors the shape of the outer step 224. More specifically, the conical shape of the inner step 242 may match or mirror the conical shape of the outer step 224. The inner step 242 may be at a non-perpendicular and/or non-parallel angle with the remaining portion of the radially outer surface 273 of the support frame 270. The outer step 224 may be angled towards the lower end 290 of the support frame 270, which advantageously facilitates the inner step 242 sliding off of the outer step 224 when the applied load or force of the hood 110 slam exceeds a predetermined value or third magnitude.

The size and angle of the outer step 224 and the inner step 242 may be a factor in determining the relationship between the deflection of the bumper head 220 and the force applied on it. As such, the sizes and angles may vary depending upon the material and/or slam type of the hood 110, as described above, and the desired predetermined magnitude of force required to collapse the bumper head 220 from the uncollapsed position to the collapsed position.

The plunger 210 is configured to receive the force from closure of the hood 110. The plunger 210 is configured to be the first component of the hood bumper 200 to receive the force from closure the hood 110. The plunger 210 is collapsible into a compressed position, in which the plunger 210 is substantially disposed within the bumper head 220 as depicted in FIG. 4B, when a force exceeding a defined limit is exerted thereon.

The biasing mechanism 246 is configured to compress and absorb the hood closure force until the plunger 210 is fully compressed into the bumper head 220, as shown in FIG. 4B. Once the plunger 210 is fully compressed in the bumper head 220 then the bumper head 220 begins absorbing additional force from the hood 110. The bumper head 220 is configured to receive the additional force applied on it by the hood 110 via compression of the flexible material by which it is constructed.

Once the force on the hood 110 exceeds the third magnitude, the bumper head 220 collapses around the housing 222 while the support frame 270 collapses into the internal chamber 230 towards the base 226, as illustrated in FIG. 4C. The plunger 210 may collapse further into the housing with the bumper head 220 when the bumper head 220 collapses with the support frame 270.

A portion of radially inward wall 272 extends into the internal chamber 230 of the housing 222, as illustrated in FIGS. 4A, 4B, and 4C. The portion or section of the radially inward wall 272 located within the internal chamber 230 of the housing 222 increases when the support frame 270 has collapsed, as illustrated in FIG. 4C.

The second end 223 of the wall 227 of the housing 222 is configured to be inserted into the channel 278, as illustrated in FIGS. 4A, 4B, and 4C. A portion of the wall 227 may be located in the channel 278 when the bumper head 220 is in the uncollapsed position of FIG. 4A. In the uncollapsed position, the second end 223 of the wall 227 is located at a distance D1 away from the head 276.

The bumper head 220 is normally in an uncollapsed position, in which the bumper head 220 is supported by the support frame 270 above the housing 222, as illustrated in FIGS. 4A and 4B. The bumper head 220 is collapsible from the uncollapsed position into a collapsed position, in which the bumper head 220 is substantially disposed around the housing 222 as depicted in FIG. 4C, when the force exceeds the third magnitude.

When the bumper head 220 moves to the collapsed position, the head 276 moves towards the support flange 229 and the bumper head 220 encloses a larger portion of the wall 227 as the radially inward wall 272 is pushed further into the internal chamber 230. When the bumper head 220 is in the collapsed position, the distance D1 between the second end 223 of the wall 227 and the head 276 decreases or goes to zero and the radially outward wall 274 of the support frame 270 may rest against the support flange 229, as illustrated in FIG. 4C.

Figure 5:
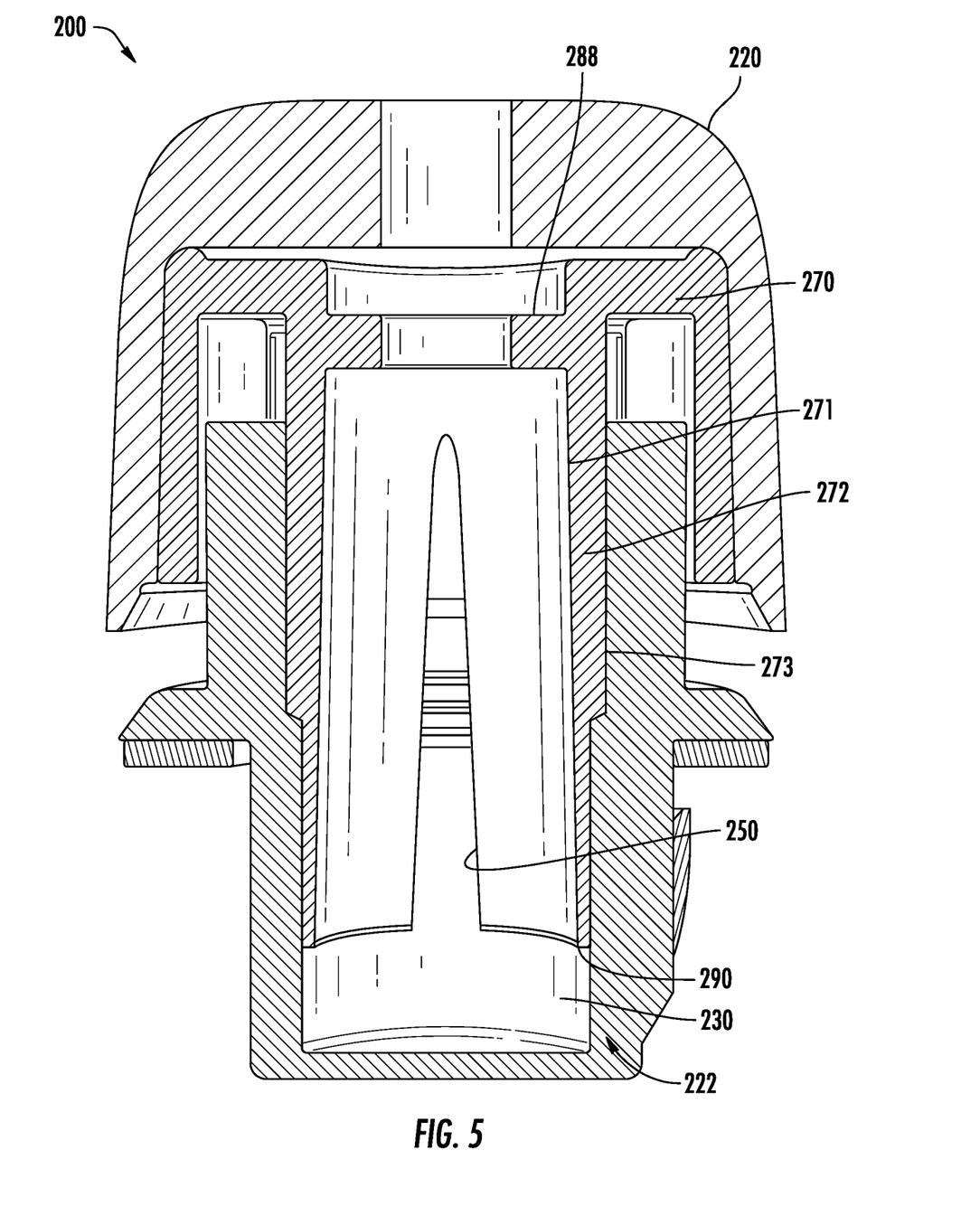
FIG. 5 is a cross-sectional view of the hood bumper of FIG. 3 with the plunger removed and a notch in the support frame visible, according to an embodiment of the present disclosure.

Referring now to FIG. 5, with continued reference to FIGS. 1-4, a cross-sectional view of the hood bumper 200 without the plunger 210 and biasing mechanism 246 is illustrated, in accordance with an embodiment of the present disclosure.

The support frame 270 may further include a notch 250 therein. The notch 250 may facilitate deformation of the support frame 270 when the force is applied to the bumper head 220, furthering the collapse of the bumper head 220 from the uncollapsed position. The dimensions of the notch 250 may be another factor in determining the relationship between the deflection of the bumper head 220 and the force applied on it, and as such, may vary depending upon the material and/or slam type of the hood 110, as well as the desired predetermined magnitude of applied force. As illustrated in FIG. 5, the notch 250 may be triangular in shape, such that the notch 250 is wider at or proximate to the lower end 290 of the support frame 270 and progressively narrower closer to the upper end 288 of the support frame 270. Advantageously, this triangular shape facilitates deformation of the radially inward wall 272 of the support frame 270 and the collapse of the support frame 270 into the internal chamber 230 of the housing 222.

The notch 250 may be a cut-out in the support frame 270 extending from the radially inner surface 271 to radially outer surface 273 or the notch 250 may be an area of reduced material thickness in the support frame 270, which creates a weak point in the support frame 270 that allows the radially inward wall 272 of the support frame 270 to deform under a predetermined load.

Figure 6:
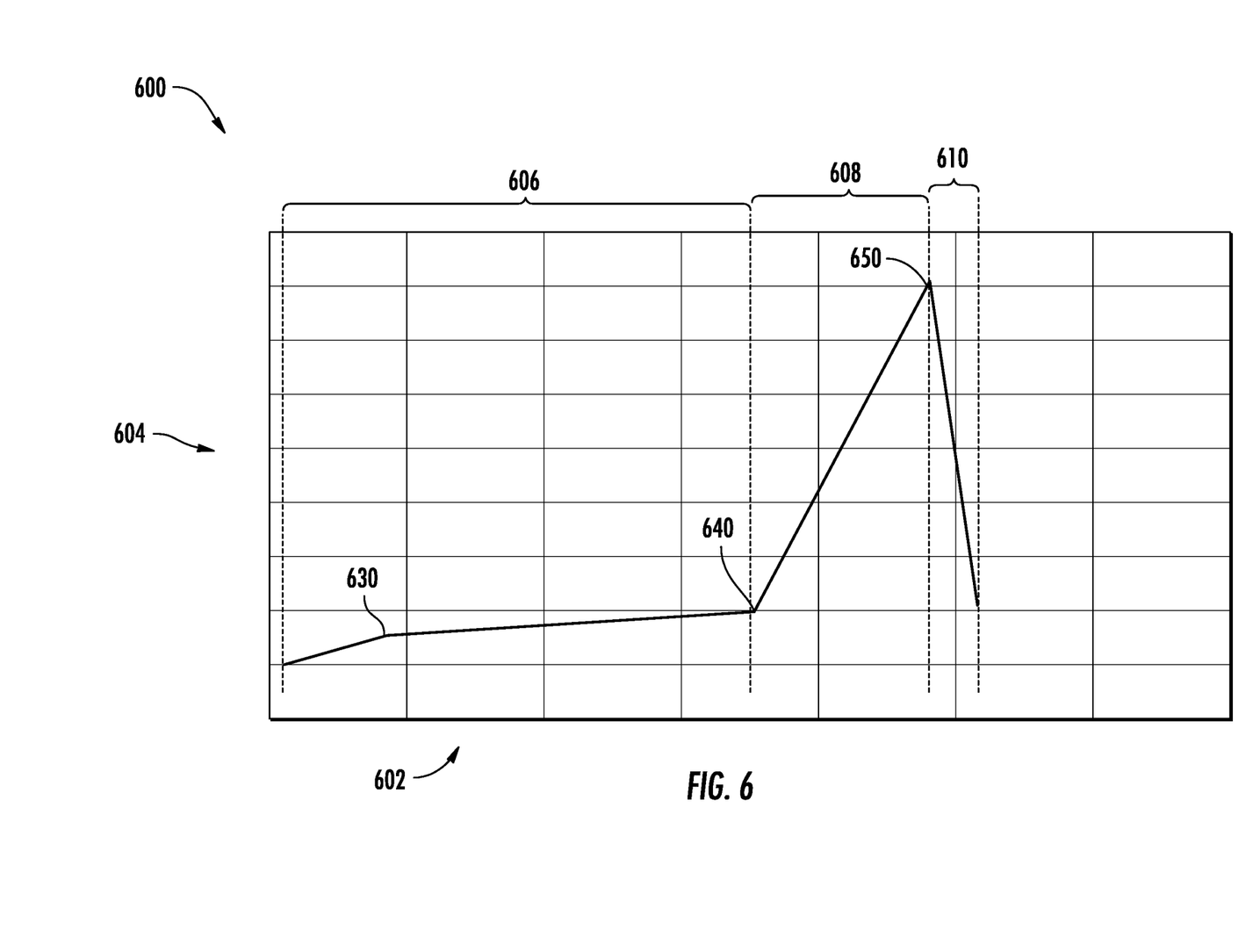
FIG. 6 is a graph illustrating the relationship between the deflection of the hood bumper and the force applied on the hood bumper, according to an embodiment of the present disclosure.

Referring now to FIG. 6, with continued reference to the previous figures, a chart 600 demonstrating a relationship between the deflection of the hood bumper 200 (x-axis 602) and the force applied (y-axis 604) is illustrated, in accordance with an embodiment of the present disclosure. The first zone 606 represents the deflection of the plunger 210, the second zone 608 represents the deflection of the bumper head 220 (i.e., the bumper head 220 deformation), and the third zone 610 represent the collapse of the support frame 270 supporting the bumper head 220 into the internal chamber 230 of the housing 222. The amount of force may vary depending upon the material and/or the slam type of the hood 110, as described above. Furthermore, in the scenario of an object striking the hood 110, the force may further be dependent upon other factors, such as the speed of the vehicle 100, the size of the object, and the like. It should be appreciated that the second zone 608 and the third zone 610 may overlap.

Different magnitudes of forces are identified on the chart 600. The first magnitude 630 is where the plunger 210 may begin to compress after being initially compressed by the hood 110. The second magnitude 640 is the force required to completely depress the plunger 210 into the bumper head 220. At forces above the second magnitude 640, the hood 110 compress bumper head 220. Since the bumper head 220 is made from a flexible material, the bumper head 220 has the ability to absorb some of the force by compressing. The third force 650 represents the force required to collapse the support frame 270.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A hood bumper for a vehicle having a hood, the hood bumper comprising:
  a housing having a wall, a base, an internal chamber, and an opening to the internal chamber, the wall having an interior surface and an exterior surface, wherein the interior surface defines the internal chamber;
  a biasing mechanism operably connected to the housing;
  a plunger operably connected to the biasing mechanism and configured to receive an exerted force from the hood, wherein the plunger is configured to move from an extended position to a compressed position into the internal chamber and compress the biasing mechanism when the force is greater than a first magnitude;
  a bumper head operably connected to the housing, the plunger being configured to protrude through the bumper head in the extended position and being configured to fully move into the bumper head when the exerted force is greater than a second magnitude, wherein the bumper head is configured to receive the force from the hood when the exerted force is greater than the second force, and wherein the bumper is configured to be compressible when the exerted force is above the second magnitude; and
  a support frame operably connecting the bumper head to the housing, wherein the support frame is collapsible from an uncollapsed position to a collapsed position when the force is greater than a third magnitude;
  wherein the support frame is disposed radially inboard of the bumper head.

2. The hood bumper of claim 1, wherein the bumper head is configured to collapse with the support frame from the uncollapsed position to the collapsed position.

3. The hood bumper of claim 1, wherein the bumper head further comprises:
  a first head end;
  a second head end located opposite the first head end;
  an impact portion located at the first head end;
  a side wall extending from the impact portion to the second head end;
  a cavity defined within the bumper head.

4. The hood bumper of claim 3, wherein the support frame is operably connected to the bumper head via the cavity.

5. The hood bumper of claim 3, wherein the bumper head further comprises a through hole extending from the cavity through the impact portion, wherein the plunger extends through the through hole when in the extended position.

6. The hood bumper of claim 1, wherein the support frame further comprises:
a radially outward wall;
a radially inward wall located radially inward from the radially outward wall; and
a head connecting the radially outward wall to the radially inward wall.

7. The hood bumper of claim 6, wherein the support frame further comprises:
an upper end;
a lower end;
an upper wall located at the upper end, the upper wall including an upper surface and a lower surface located opposite the upper surface; and
a plunger opening extending through the upper wall, wherein the plunger extends through the plunger opening into the bumper head.

8. The hood bumper of claim 6, wherein the radially inward wall of the support frame further comprises:
a radially inner surface;
a radially outer surface; and
an inner step extending about the radially outer surface, wherein the radially inward surface of the wall further comprises an outer step, and
wherein the inner step is configured to fit within the outer step, interlock with the outer step, or rest on the outer step to maintain the support frame in the uncollapsed position.

9. The hood bumper of claim 8, wherein the radially inner surface of the radially inward wall of the support frame defines a cavity within the radially inward wall of the support frame, wherein a portion of the plunger is located within the cavity.

10. The hood bumper of claim 9, wherein a section of the radially inward wall of the support frame is located within the internal chamber.

11. The hood bumper of claim 8, wherein the radially inward wall of the support frame further comprises a notch.

12. The hood bumper of claim 11, wherein the notch extends from the radially inner surface to the radially outer surface.

13. The hood bumper of claim 11, wherein the notch is triangular in shape.

14. A hood bumper for a vehicle having a hood, the hood bumper comprising:
a housing having a wall, a base, an internal chamber, and an opening to the internal chamber, the wall having an interior surface and an exterior surface, wherein the interior surface defines the internal chamber;
a biasing mechanism operably connected to the housing;
a plunger operably connected to the biasing mechanism and configured to receive an exerted force from the hood, wherein the plunger is configured to move from an extended position to a compressed position into the internal chamber and compress the biasing mechanism when the force is greater than a first magnitude;
a bumper head operably connected to the housing, the plunger being configured to protrude through the bumper head in the extended position and being configured to fully move into the bumper head when the exerted force is greater than a second magnitude, wherein the bumper head is configured to receive the force from the hood when the exerted force is greater than the second force, and wherein the bumper is configured to be compressible when the exerted force is above the second magnitude; and
a support frame operably connecting the bumper head to the housing, wherein the support frame is collapsible from an uncollapsed position to a collapsed position when the force is greater than a third magnitude;
wherein the support frame further comprises:
a radially outward wall;
a radially inward wall located radially inward from the radially outward wall; and
a head connecting the radially outward wall to the radially inward wall;
wherein the radially outward wall is in a facing spaced relationship with the radially inward wall forming a channel therebetween, the channel being defined by the radially outward wall, the radially inward wall, and the head.

15. The hood bumper of claim 14, wherein the housing further comprises:
a first end; and
a second end located opposite the first end, the wall extending from the first end to the second end,
wherein the base is located at the first end and the opening is located at the second end, and
wherein the second end of the wall is located in the channel.

16. The hood bumper of claim 15, wherein the second end of the wall is located at a distance away from the head in the uncollapsed position, and wherein the distance between the second end of the wall and the head decreases or goes to zero in the collapsed position.

17. A vehicle comprising:
a compartment:
a hood to cover the compartment; and
at least one hood bumper configured to contact the hood, the at least one hood bumper comprising:
a housing having a wall, a base, an internal chamber, and an opening to the internal chamber, the wall having an interior surface and an exterior surface, wherein the interior surface defines the internal chamber;
a biasing mechanism operably connected to the housing;
a plunger operably connected to the biasing mechanism and configured to receive an exerted force from the hood, wherein the plunger is configured to move from an extended position to a compressed position into the internal chamber and compress the biasing mechanism when the force is greater than a first magnitude;
a bumper head operably connected to the housing, the plunger being configured to protrude through the bumper head in the extended position and being configured to fully move into the bumper head when the exerted force is greater than a second magnitude, wherein the bumper head is configured to receive the force from the hood when the exerted force is greater than the second force, and wherein the bumper is configured to be compressible when the exerted force is above the second magnitude; and
a support frame operably connecting the bumper head to the housing, wherein the support frame is collapsible from an uncollapsed position to a collapsed position when the force is greater than a third magnitude;
wherein the support frame is disposed radially inboard of the bumper head.

18. The vehicle of claim 17, wherein the bumper head is configured to collapse with the support frame from the uncollapsed position to the collapsed position.

19. The vehicle of claim 17, wherein the bumper head further comprises:
   a first head end;
   a second head end located opposite the first head end;
   an impact portion located at the first head end;
   a side wall extending from the impact portion to the second head end; and
   a cavity defined within the bumper head.

20. The vehicle of claim 19, wherein the support frame is operably connected to the bumper head via the cavity.

* * * * *